(12) United States Patent
Uppala

(10) Patent No.: US 7,587,569 B2
(45) Date of Patent: *Sep. 8, 2009

(54) SYSTEM AND METHOD FOR REMOVING A STORAGE SERVER IN A DISTRIBUTED COLUMN CHUNK DATA STORE

(75) Inventor: Radha Krishna Uppala, Bellevue, WA (US)

(73) Assignee: Yahoo! Inc., Sunnyvale, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 11/305,963

(22) Filed: Dec. 19, 2005

(65) Prior Publication Data

US 2007/0143557 A1    Jun. 21, 2007

(51) Int. Cl.
*G06F 12/00* (2006.01)
(52) U.S. Cl. ............... 711/165; 711/114; 711/153; 711/173; 711/221; 707/101; 707/202; 707/203; 707/204; 714/5; 714/7
(58) Field of Classification Search ........... 711/165, 711/114, 153, 173, 221; 707/101, 202, 203, 707/204; 714/5, 7
See application file for complete search history.

(56) References Cited

U.S. PATENT DOCUMENTS

| | | | | |
|---|---|---|---|---|
| 5,657,468 A | * | 8/1997 | Stallmo et al. | 711/114 |
| 5,768,532 A | * | 6/1998 | Megerian | 709/245 |
| 5,794,229 A | * | 8/1998 | French et al. | 707/2 |
| 2007/0061544 A1 | * | 3/2007 | Uppala | 711/173 |
| 2007/0143369 A1 | * | 6/2007 | Uppala | 707/204 |

OTHER PUBLICATIONS

Eda Baykan, Recent Research on Database System Performance, Jun. 28, 2005, published on Internet at www.csd.uoc.gr/~hy460/0506_fall/instructional_material.html.
Jingren Zhou, Kenneth A. Ross, A Multi-resolution Block Storage Model for Database Design, ideas, Seventh International Database Engineering and Applications Symposium, pp. 22-33, 2003.
George Copeland, Setreg Khoshafian, a Decomposition Storage Model. ACM SIGMOD International Conference on Management of Data, pp. 268-279. ACM Press, 1985.

* cited by examiner

*Primary Examiner*—Stephen C Elmore
(74) *Attorney, Agent, or Firm*—Robert O. Bolan

(57) ABSTRACT

An improved system and method for removing a storage server in a distributed column chunk data store is provided. A distributed column chunk data store may be provided by multiple storage servers operably coupled to a network. A storage server provided may include a database engine for partitioning a data table into the column chunks for distributing across multiple storage servers, a storage shared memory for storing the column chunks during processing of semantic operations performed on the column chunks, and a storage services manager for striping column chunks of a partitioned data table across multiple storage servers. Any data table may be flexibly partitioned into column chunks using one or more columns with various partitioning methods. Storage servers may then be removed and column chunks may be redistributed among the remaining storage servers in the column chunk data store.

20 Claims, 10 Drawing Sheets

SYSTEM AND METHOD FOR REMOVING A STORAGE SERVER IN A DISTRIBUTED COLUMN CHUNK DATA STORE

CROSS-REFERENCE TO RELATED APPLICATIONS

The present invention is related to the following United States patent applications, filed concurrently herewith and incorporated herein in their entireties:

"System and Method for Updating Data in a Distributed Column Chunk Data Store," U.S. patent application Ser. No. 11/311,811;

"System and Method for Adding a Storage Server to a Distributed Column Chunk Data Store," U.S. patent application Ser. No. 11/305,916;

"System and Method for Recovering from Failure of a Storage Server in a Distributed Column Chunk Data Store," U.S. patent application Ser. No. 11/311,510;

"System for Query Processing of Column Chunks in a Distributed Column Chunk Data Store," U.S. patent application Ser. No. 11/305,998;

"System of a Hierarchy of Servers for Query Processing of Column Chunks in a Distributed Column Chunk Data Store," U.S. patent application Ser. No. 11/311,825;

"Method for Query Processing of Column Chunks in a Distributed Column Chunk Data Store," U.S. patent application Ser. No. 11/305,997;

"Method Using Query Processing Servers for Query Processing of Column Chunks in a Distributed Column Chunk Data Store," U.S. patent application Ser. No. 11/305,915; and "Method Using a Hierarchy of Servers for Query Processing of Column Chunks in a Distributed Column Chunk Data Store," U.S. patent application Ser. No. 11/305,958.

The present invention is also related to the following copending United States Patent Applications filed Sep. 13, 2005, assigned to the assignee of the present invention, and hereby incorporated by reference in their entireties:

"System for a Distributed Column Chunk Data Store," U.S. patent application Ser. No. 11/226,606;

"Method for a Distributed Column Chunk Data Store," U.S. patent application Ser. No. 11/226,667; and "System and Method for Compression in a Distributed Column Chunk Data Store," U.S. patent application Ser. No. 11/226,668.

FIELD OF THE INVENTION

The invention relates generally to computer systems, and more particularly to an improved system and method for removing a storage server in a distributed column chunk data store.

BACKGROUND OF THE INVENTION

Distributed storage systems implemented either as a distributed database or a distributed file system fail to scale well for data mining and business intelligence applications that may require fast and efficient retrieval and processing of large volumes of data. Distributed databases for large volumes of data, perhaps on the order of terabytes, may be traditionally implemented across several servers, each designed to host a portion of a database and typically storing a particular table data. In some implementations, such a system may also store a horizontally partitioned table of data on one or more servers. For instance, the technique known as horizontal partitioning may be used to store a subset of rows of data in a table resident on a storage server. Queries for retrieving data from the distributed storage system may then be processed by retrieving rows of data having many associated columns of datum for which only one or few columns may be needed to process the query. As a result, the storage and retrieval of data in these types of systems is inefficient, and consequently such systems do not scale well for handling terabytes of data.

Typical transaction processing systems using a distributed database likewise fail to scale well for data mining and business intelligence applications. Such systems may characteristically have slower processing speed during a failed transaction. During transaction processing a failed transaction may become abandoned and the database may be rolled back to a state prior to the failed transaction. Such database implementations prove inefficient for updating large data sets on the order of gigabytes or terabytes.

Distributed file systems are also inadequate for storage and retrieval of data for data mining and business intelligence applications. First of all, distributed file systems may only provide low-level storage primitives for reading and writing data to a file. In general, such systems fail to establish any semantic relationships between data and files stored in the file system. Unsurprisingly, semantic operations for data storage and retrieval such as redistributing data, replacing storage, and dynamically adding additional storage are not available for such distributed file systems.

What is needed is a way for providing data storage, query processing and retrieval for large volumes of data perhaps in the order of hundreds of terabytes for data warehousing, data mining and business intelligence applications. Any such system and method should allow the use of common storage components without requiring expensive fault-tolerant equipment.

SUMMARY OF THE INVENTION

Briefly, the present invention may provide a system and method for removing a storage server in a distributed column chunk data store. A distributed column chunk data store may be provided by multiple storage servers operably coupled to a network. A client executing an application may also be operably coupled to the network. A storage server provided may include a database engine for partitioning a data table into column chunks for distributing across multiple storage servers, a storage shared memory for storing the column chunks during processing of semantic operations performed on the column chunks, and a storage services manager for striping column chunks of a partitioned data table across multiple storage servers.

The database engine may include a loading services module for importing data into a data table partitioned into column chunks, a query services module for receiving requests for processing data stored as column chunks striped across multiple storage servers, a metadata services module for managing metadata about the column chunks striped across the plurality of storage servers, a transaction services module for maintaining the integrity of the information about semantic operations performed on the column chunks, and a storage services proxy module for receiving storage services requests and sending the requests for execution by the storage services manager. The storage services manager may include compression services for compressing the column chunks before storing to the column chunk data store and transport services for sending one or more compressed or uncompressed column chunks to another storage server.

Advantageously, a data table may be flexibly partitioned into column chunks using one or more columns as a key with various partitioning methods, including range partitioning, list partitioning, hash partitioning, and/or combinations of these partitioning methods. There may also be a storage policy for specifying how to partition a data table for distributing column chunks across multiple servers, including the number of column chunks to create. The storage policy may also specify the desired level of redundancy of column chunks for recovery from failure of one or more storage servers storing the column chunks. The storage policy may also specify how to assign column chunks to available storage servers. There may be a storage policy for each data table that may be different from the storage policy for another data table and may specify a different method for partitioning the data table into column chunks, a different level of redundancy for recovery from failure of one or more servers, and/or a different method for distributing the column chunks among the multiple storage servers.

The invention may also support the removal of one or more storage servers from the distributed column chunk data store. Metadata may be updated for distributing column chunks from the server to be removed to the remaining storage servers of the column chunk data store. Then the column chunks may be migrated from the server to be removed to one or more of the remaining storage servers of the column chunk data store, and the storage server may be subsequently removed. In an embodiment, the parity of column chunks calculated for supporting a level of redundancy specified in a storage policy for recovery from failure of one or more storage servers may be recomputed when the number of storage servers remaining after removal of a storage server may no longer be greater than the number of column chunks used to compute the parity column chunks.

Other advantages will become apparent from the following detailed description when taken in conjunction with the drawings, in which:

DETAILED DESCRIPTION

Exemplary Operating Environment

Figure 1:
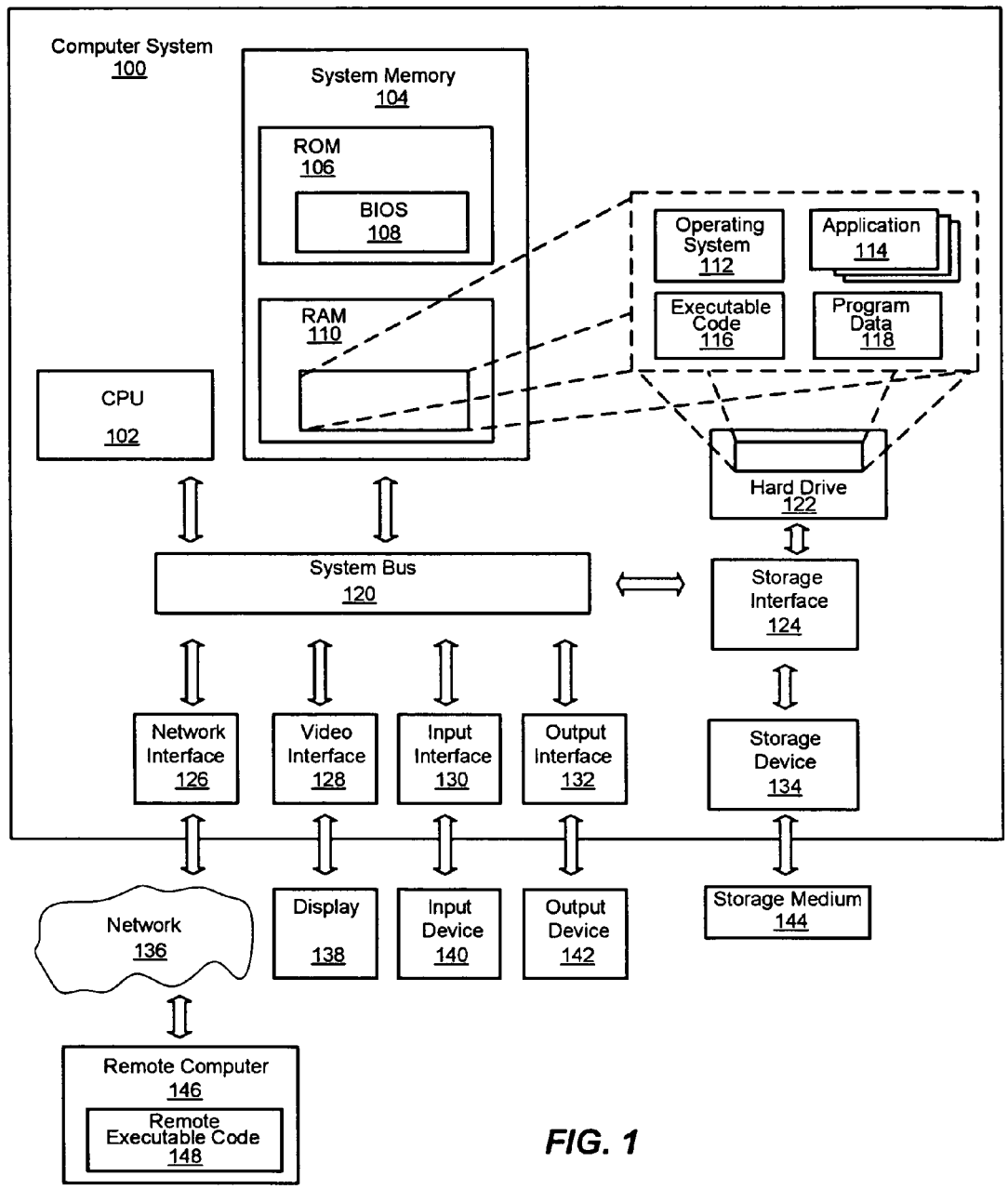
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may also embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Removing a Storage Server in a Distributed Column Chunk Data Store

The present invention is generally directed towards a system and method for removing a storage server in a distributed column chunk data store. More particularly, the present invention provides multiple storage servers operably coupled by a network for storing distributed column chunks of partitioned data tables. Any data table may be partitioned into column chunks and the column chunks may then be distributed for storage among multiple storage servers. To do so, a data table may be flexibly partitioned into column chunks by applying various partitioning methods using one or more columns as a key, including range partitioning, list partitioning, hash partitioning, and/or combinations of these partitioning methods. Subsequently, one or more storage servers may be removed from the distributed column chunk data store. Metadata may be updated for distributing column chunks from the server to be removed to the remaining storage servers of the column chunk data store. Then the column chunks may be migrated from the server to be removed to one or more of the remaining storage servers of the column chunk data store, and the storage server may be removed.

As will be seen, the parity of column chunks calculated for supporting the level of redundancy specified in a storage policy for recovery from failure of one or more storage servers may be recomputed when the number of storage servers remaining after removal of a storage server may no longer be greater than the number of column chunks used to compute the parity column chunks. As will be understood, the various block diagrams, flow charts and scenarios described herein are only examples, and there are many other scenarios to which the present invention will apply.

Figure 2:
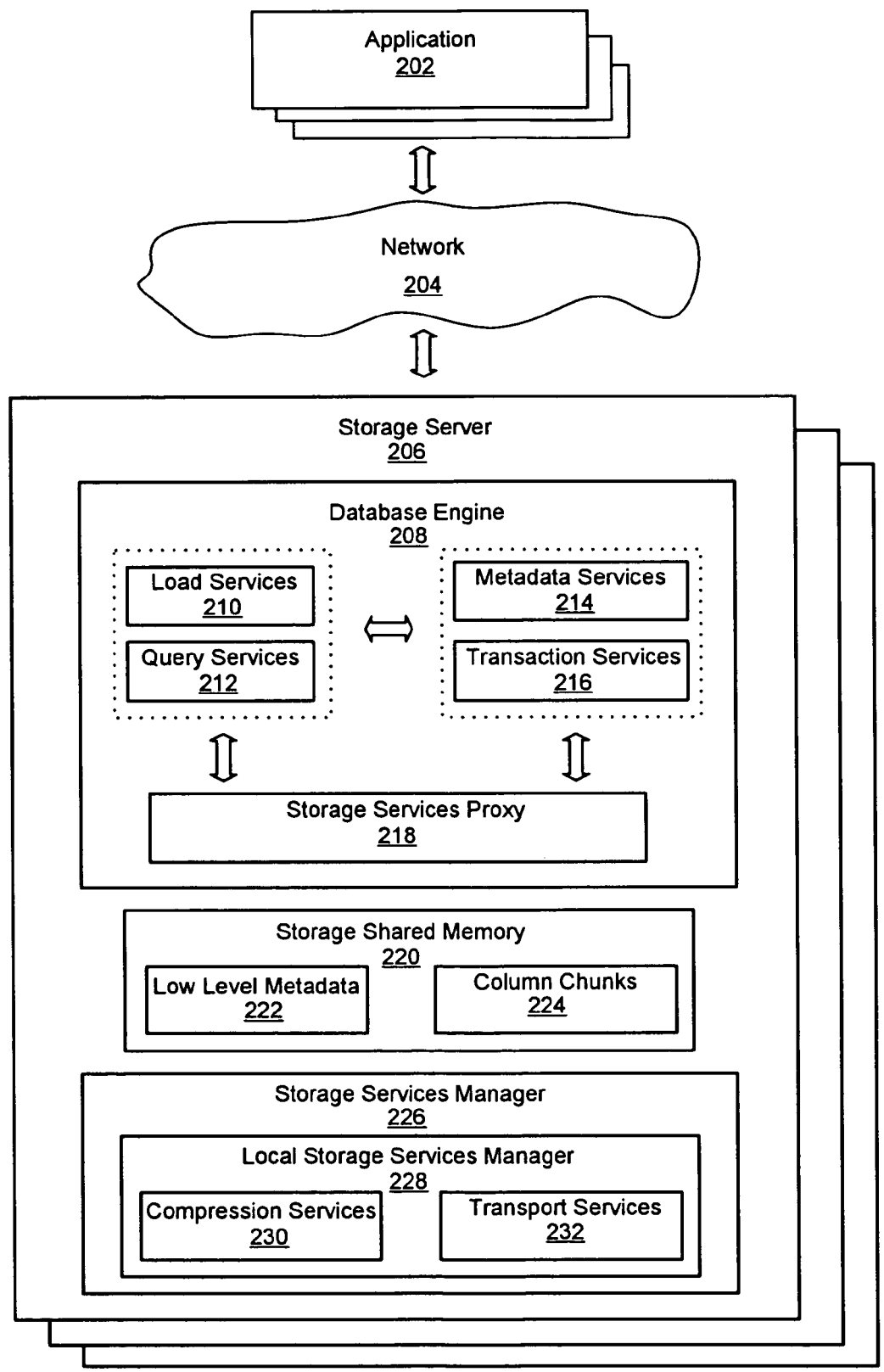
FIG. 2 is a block diagram generally representing an exemplary architecture of system components for a column chunk data store, in accordance with an aspect of the present invention.

Turning to FIG. 2 of the drawings, there is shown a block diagram generally representing an exemplary architecture of system components for a distributed column chunk data store. Those skilled in the art will appreciate that the functionality implemented within the blocks illustrated in the diagram may be implemented as separate components or the functionality of several or all of the blocks may be implemented within a single component. For example, the functionality for the storage services manager 226 may be included in the same component as the database engine 208. Or the functionality of transport services 232 may be implemented as a separate component.

As used herein, a column chunk data store may mean a large distributed system of operably coupled storage servers, each capable of storing column chunks. In various embodiments, one or more applications 202 may be operably coupled to one or more storage servers 206 by a network 204. The network 204 may be any type of network such as a local area network (LAN), a wide area network (WAN), or other type of network. In general, an application 202 may be any type of executable software code such as a kernel component, an application program, a linked library, an object with methods, and so forth. In one embodiment, an application may execute on a client computer or computing device, such as computer system environment 100 of FIG. 1 which may be operably coupled to one or more storage servers 206 by the network 204. An application 202 may include functionality for querying the column chunk data store to retrieve information for performing various data mining or business intelligence operations, such as computing segment membership, performing some aggregation of data including summarization, and so forth.

A storage server 206 may be any type of computer system or computing device such as computer system environment 100 of FIG. 1. The storage server may provide services for performing semantic operations on column chunks such as redistributing data, replacing storage, and/or adding storage and may use lower-level file system services in carrying out these semantic operations. A storage server 206 may include a database engine 208 storage shared memory 222, and a storage services manager 226. Each of these modules may also be any type of executable software code such as a kernel component, an application program, a linked library, an object with methods, or other type of executable software code.

The database engine 208 may be responsible, in general, for communicating with an application 202, communicating with the storage server to satisfy client requests, accessing the column chunk data store, and communicating with the storage services manager 226 for execution of storage operations, including accessing column chunks 224 in storage shared memory 220. The database engine 208 may include load services 210, query services 212, metadata services 214, transaction services 216 and a storage services proxy 218. Load services 210 may be used for importing data into the data tables. Query services 212 may process received queries by retrieving the data from the storage services manager 226 and processing the retrieved data. The load services 210 and query services 212 may communicate with the metadata services 214 and transaction services 216 using a communication mechanism such as inter-process communication. Each of these services may in turn communicate with the storage services proxy 218 to request services such as retrieving and loading column chunks into storage shared memory 220. The storage services proxy 218 may receive storage read and write requests and pass the requests off to the storage services manager 226 to execute the request.

The metadata services 214 may provide services for the configuration of the storage servers and may manage metadata for the database engine and the column chunk data store. The metadata may include, for example, data tables that reflect the current state of the system including the name of each server configured in the system, the load on each server, the bandwidth between servers, and many other variables maintained in the data tables. There may be dynamically updated tables and static tables of data. Static tables of data may include configuration tables, the defined logical tables, policies that may apply for partitioning the data table and storage distribution, and so forth. Some tables, such as configuration tables, may be generated dynamically by the system based upon system configuration. The metadata services 214 may include services to dynamically update metadata, such as configuration tables. In addition, metadata services 214 may include services to add or update fixed metadata such as adding new logical data table definitions or updating an existing logical data table definition.

The transaction services 216 may be responsible for maintaining active transactions in the system and may provide various services such as identifying and loading the appropriate version of column chunks. The transaction services 216 can also notify metadata services to update or commit metadata relating to a specific transaction. Generally, a transaction may include semantic operations that modify the system or that may be performed on data, including data loading, data optimization, data retrieval, updating existing data table, creating new tables, modifying the data schema, creating a new storage policy, partitioning data tables, recording the column chunk distribution in storage servers, and so forth. For each transaction such as incrementally updating a data table, there may be an indication of a start of a transaction and end of transaction when the update of the data table completes. Other examples of transactions may be executing a query, including generating intermediate data tables or other data tables, or optimizing storage of column chunks. To do so, the query services may use transaction services to process a query and the storage services manager may use transactions services while optimizing column chunk storage.

The storage shared memory 220 of the storage server 206 may include low level metadata 222 and column chunks 224. The low level metadata may include information about physical storage, such as the file name and server name where a column chunk may be located, what the compressed size of a column chunk may be, what the uncompressed size of a column chunk may be, what the checksum on a column chunk may be for verifying that the column chunk is not corrupted on the disk storage, and so forth. The storage services manager 226 may generate low level metadata 222 by using the metadata such as policies, server configurations, resources available in metadata to generate physical storage for column chunks.

The storage services manager 226 may include a local storage services manager 228 that may provide compression services 230 and transport services 232. The compression services 230 may perform data domain compression and decompression of column chunks. For instance, data domain compression may be performed before storing the column chunks in storage and data domain decompression may be performed upon retrieving the column chunks from storage. Transports services 232 may provide services to transfer column chunks between servers. In one embodiment, a low level protocol may be employed upon a TCP/IP protocol stack for sending and receiving column chunks.

Figure 3:
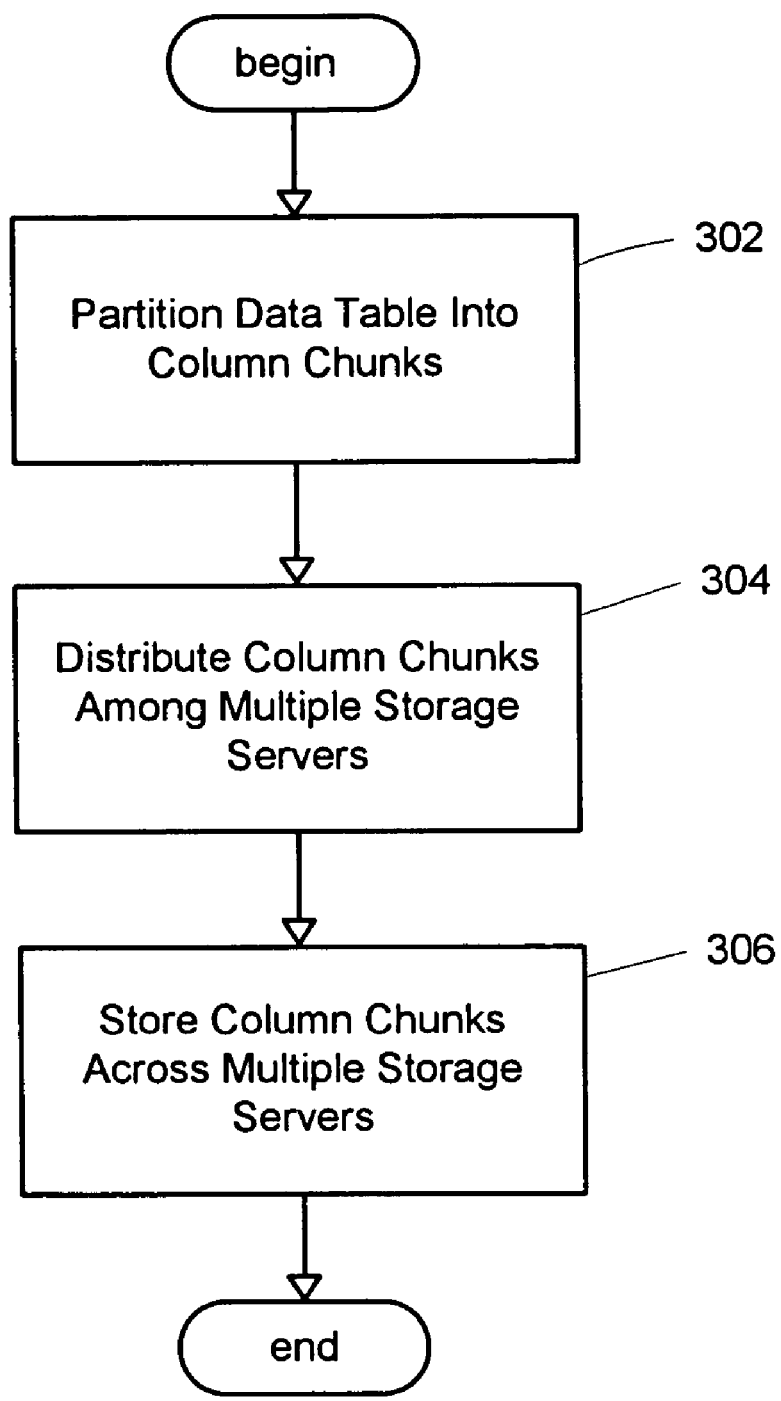
FIG. 3 is a flowchart generally representing the steps undertaken in one embodiment for storing column chunks among multiple storage servers in the column chunk data store, in accordance with an aspect of the present invention.

There are many applications which may use the present invention for storing large volumes of detailed data over long periods of time. Data mining, segmentation and business intelligence applications are examples among these many applications. FIG. 3 presents a flowchart generally representing the steps undertaken in one embodiment for storing column chunks among multiple storage servers in the column chunk data store. At step 302, a data table may be partitioned into column chunks. As used herein, a column chunk may mean a column of a data table partitioned using one or more columns as a key. Any type of data table may be partitioned into column chunks. For instance, a large fact table capturing transactions of users logging into a website may be partitioned into column chunks. In one embodiment, the data table may be partitioned into column chunks by performing column-wise partitioning whereby a partition may be specified by a set of columns. In another embodiment, a combination of some data table partitioning technique and column-wise partitioning may be performed. In this embodiment, the data table may be first partitioned into several data tables and then column-wise partitioning may be performed on the resulting data tables to create column chunks. To do so, those skilled in the art will appreciate that a data table may be partitioned into column chunks using any number of partitioning techniques such as range partitioning by specifying a range of value for a partitioning key, list partitioning by specifying a list of values for a partitioning key, hash partitioning by applying hashing to a partitioning key, combinations of these partitioning techniques, and other partitioning techniques known to those skilled in the art.

Once the data table may be partitioned into column chunks, the storage server may distribute the column chunks among multiple storage servers at step 304. For example, the column chunks of the data table may be striped across multiple storage servers. In one embodiment, each column chunk of the data table may be assigned to an available storage server using any assignment method including round robin order. In various embodiments, column chunks of a data table may be striped across multiple storage servers. As used herein, column chunk striping means striping column chunks of a data table across multiple storage servers. Any level of redundancy may be implemented in distributing the column chunks for recovery of one or more failed servers. For example, column chunk parity may be calculated and stored to enable recovery from failure of one server. In an embodiment, a bitwise XOR operation may be performed on two column chunks to create a parity column chunk. Additional bitwise XOR operations may be performed with a parity column chunk and another binary representation of a column chunk to compute a parity column chunk for three column chunks. The resulting parity column chunk may then be assigned to an available server that does not store one of the three column chunks used to make the parity column chunk. In this way, any number of parity column chunks may be calculated and assigned to storage servers for recovery from failure of one or more storage servers. It should be noted that prior to performing a bitwise XOR operation on two column chunks of unequal length, the shorter column chunk may be padded with 0's until it become of equal length with the other column chunk.

Once the distribution of column chunks among the multiple storage servers may be determined, the column chunks may be stored on their assigned servers at step 306. After the column chunks have been stored, processing may be finished for storing column chunks among multiple storage servers in the column chunk data store.

Figure 4:
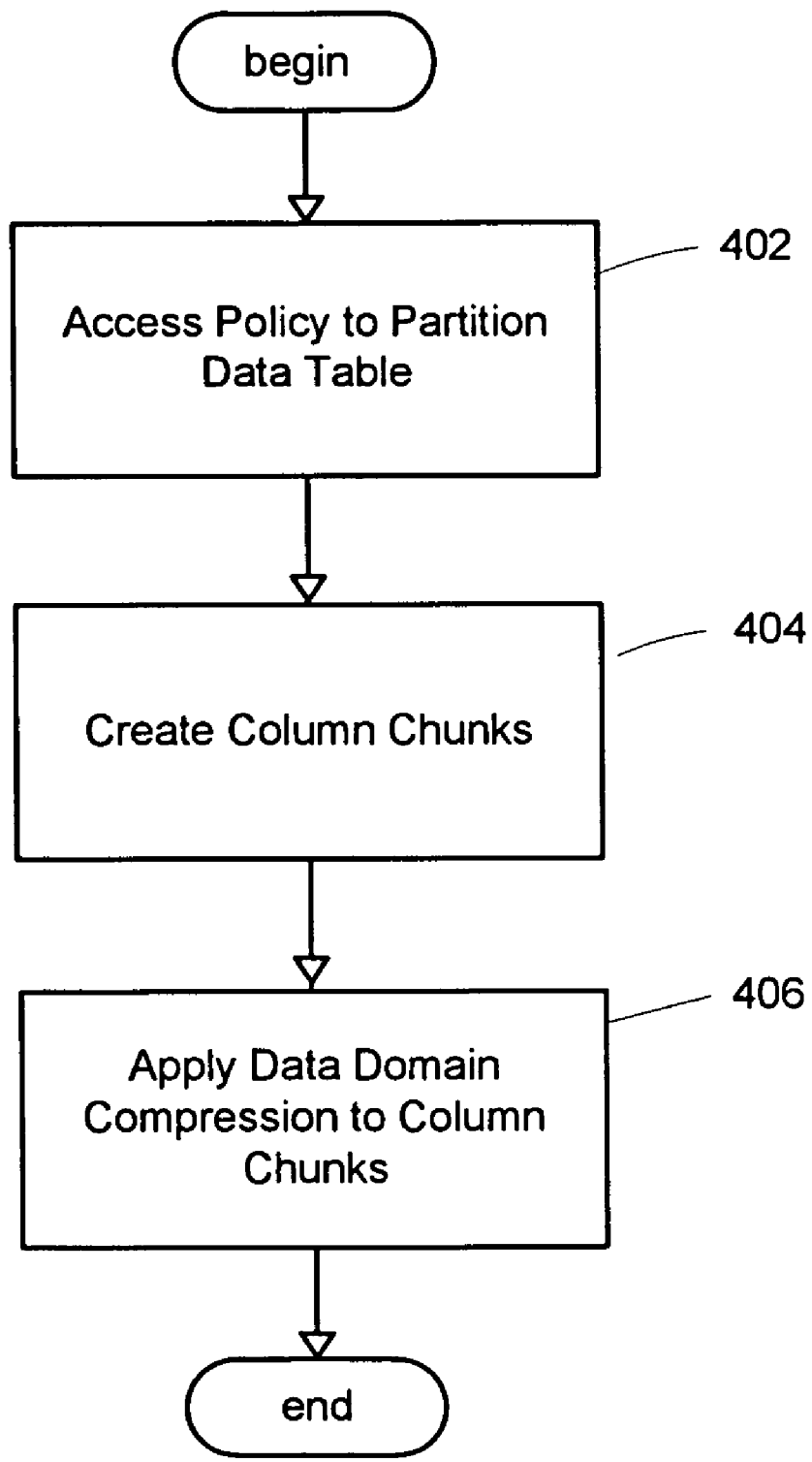
FIG. 4 is a flowchart generally representing the steps undertaken in one embodiment for partitioning a data table into column chunks, in accordance with an aspect of the present invention.

FIG. 4 presents a flowchart generally representing the steps undertaken in one embodiment for partitioning a data table into column chunks. At step 402, a policy for partitioning the data table into column chunks may be accessed. For example, there may be a policy stored as part of the metadata that may specify how the data table may be partitioned into column chunks and how the column chunks may be distributed among multiple storage servers in the column chunk data store. In one embodiment, the policy may specify the number of partitions into which a column should be divided. In various embodiments, the policy may specify the degree of redundancy of the column chunks for recovery upon failure of one or more storage servers.

Any policy for partitioning the data table may then be applied at step 404 to create the column chunks. In an embodiment, partitioning may be performed on the data table by first partitioning the data table into multiple tables using range partitioning and then partitioning each of the multiple tables by applying column-wise partitioning. In various other embodiments, list partitioning, hash partitioning, or combinations of list, hash, and/or range partitioning may be applied to partition the data table into multiple tables and then column wise partitioning may be subsequently applied to each of the multiple data tables.

Once the column chunks may be created, then data domain compression may be applied to the column chunks at step 406. Data domain compression as used herein may mean applying a compression scheme designed to compress a specific data type. Given that values in a column of a column chunk may usually be the same data type and/or part of a specific data domain, partitioning a data table into column chunks may advantageously allow data in the column chunks to be compressed using a specific domain type compression scheme. For example, if a column of a column chunk may store a date that falls within a narrow range, such as between Jan. 1, 2000 and Dec. 31, 2010, the date field may be represented using the number of days since Jan. 1, 2000 rather than using a generic date representation. As another example, consider an address that may typically be stored as a string that may not compress well. By decomposing the address field into several subfields, such as street number, street name, city, state, and zip, each subfield may be represented as a separate sub-column having a specific data type that may compress well. As yet another example, consider an argument list of key-value pairs that may also be typically stored as a string that may not compress well. By decomposing the key-value pairs into separate column chunks, each column chunk may represent values having a specific data type that may compress well. Such compression may be performed using range-based compression of numeric values, decomposing a column chunk including sub-fields into separate column chunks, decomposing a column chunk including key-value pairs into separate column chunks, and so forth. After domain specific compression may be applied to the column chunks, processing for partitioning a data table into column chunks may be finished.

Figure 5A:
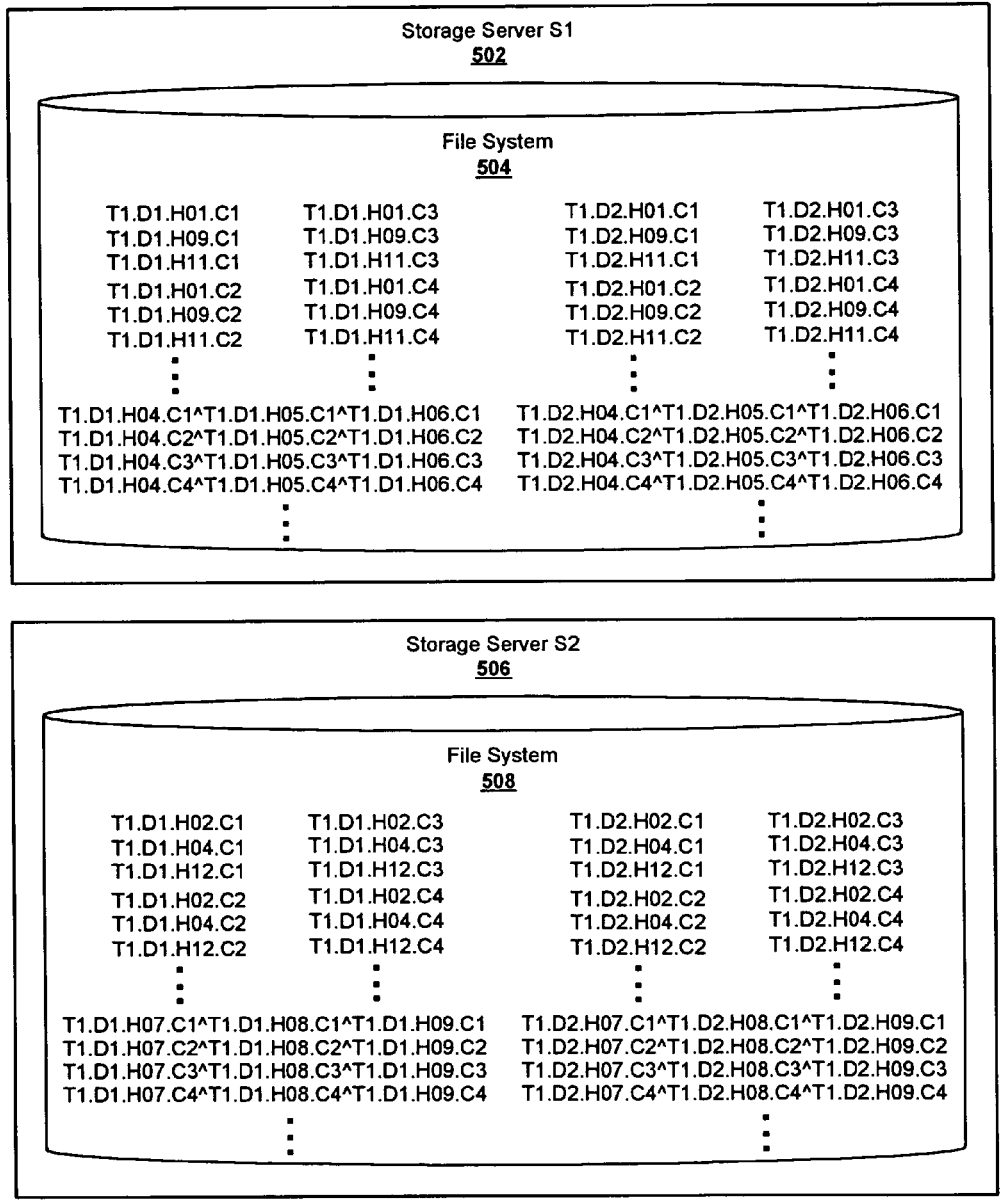
FIGS. 5A and 5B are exemplary illustrations generally depicting logical representations of column chunks of a partitioned data table striped across multiple storage servers with parity for recovering from failure of a server, in accordance with an aspect of the present invention.
Figure 5B:
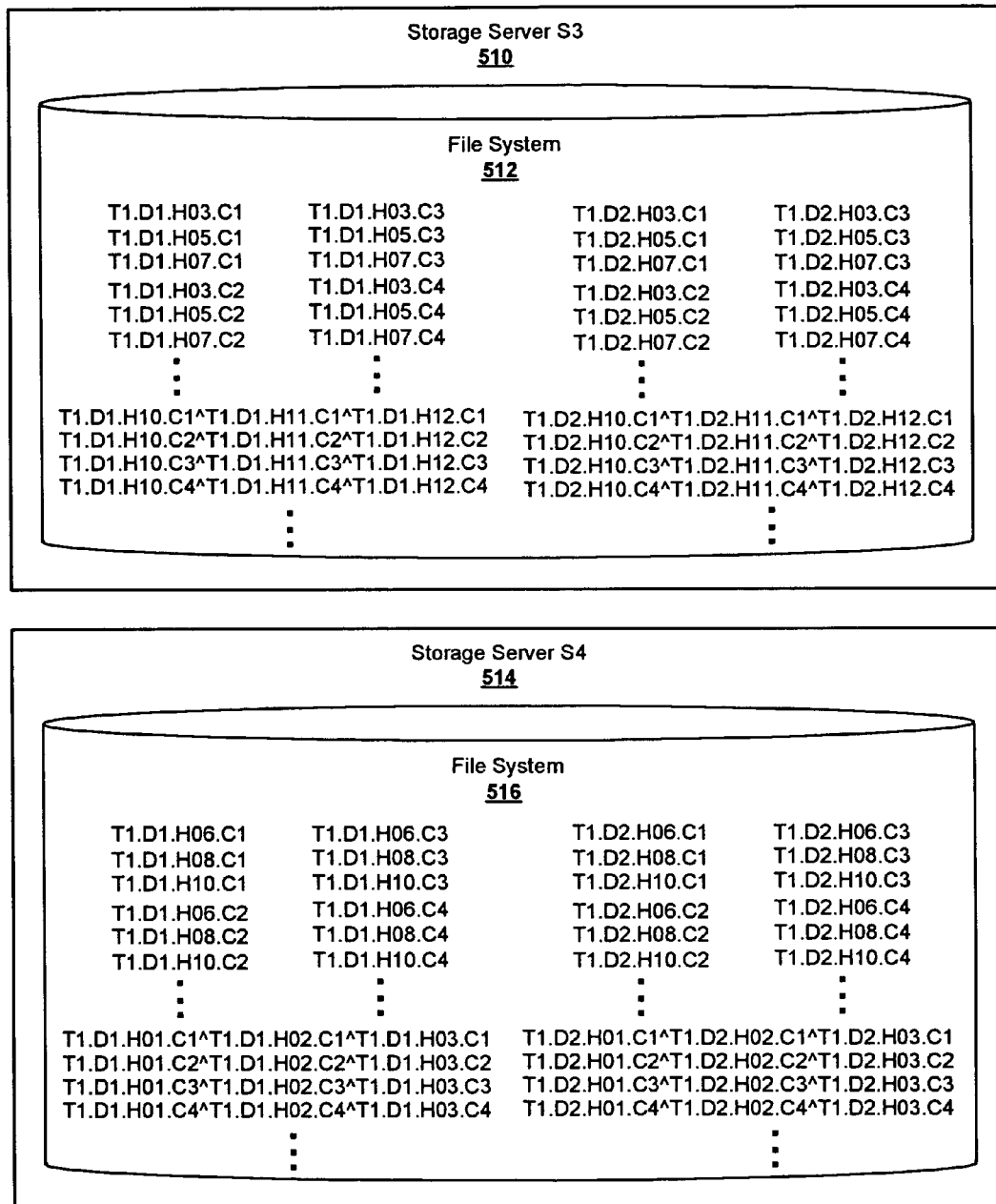

FIGS. 5A and 5B present exemplary illustrations generally depicting logical representations of column chunks of a partitioned data table striped across multiple storage servers with parity for recovering from failure of a server. There may be any number of storage servers, such as storage servers S1 502 and S2 506 illustrated in FIG. 5A, and S3 510 and S4 514 illustrated in FIG. 5B. A data table T1 may be first partitioned by date to create two data table such as T1.D1 and T1.D2, and then hashing may be applied to each of these data table to create column chunks. The storage policy may specify a redundancy level for recovery from failure of a server. There may also be a distribution policy such as column chunk striping specified in the storage policy. FIGS. 5A and 5B illustrate an embodiment of column chunk striping with redundancy across multiple servers in round robin order. For instance, hashing may produce 12 hashes, which may be represented as H01 through H12. Considering that data table T1.D1 may have four columns, C1 through C4, there may be 48 column chunks created with four column chunks in each hash bucket, which may be represented as T1.D1.H01.C1, T1.D1.H01.C2, T1.D1.H01.C3, T1.D1.H01.C4, T1.D1.H02.C1 . . . T1.D1.H12.C4 as illustrated in FIGS. 5A and 5B. Additionally, parity may be calculated by performing a bitwise XOR operation for combinations of column chunks such as
T1.D1.H04.C1^T1.D1.H05.C1^ T1.D1.H06.C1,
T1.D1.H04.C2^T1.D1.H05.C2^ T1.D1.H06.C2,
T1.D1.H04.C3^T1.D1.H05.C3^ T1.D1.H06.C3, and
T1.D1.H04.C4^T1.D1.H05.C4^ T1.D1.H06.C4.

Column chunks, T1.D1.H01.C1 through T1.D1.H01.C4, may be assigned to the first storage server, S1 502, and stored in file system 504. Additionally, parity of column chunks, T1.D1.H04.C1^T1.D1.H05.C1^ T1.D1.H06.C1 through T1.D1.H04.C4^T1.D1.H05.C4^ T1.D1.H06.C4, may also be assigned to the first storage server, S1 502, and stored in file system 504. Column chunks, T1.D1.H02.C1 through T1.D1.H02.C4 and T1.D1.H04.C1 through T1.D1.H04.C4, may be assigned to the second storage server, S2 506, and stored in file system 508. Additionally, parity of column chunks, T1.D1.H07 C1^T1.D1.H08.C1^ T1.D1.H09.C1 through T1.D1.H07.C4^T1.D1.H08.C4^ T1.D1.H09.C4, may also be assigned to the second storage server, S2 506, and stored in file system 508. Column chunks, T1.D1.H03.C1 through T1.D1.H03.C4 and T1.D1.H05.C1 through T1.D1.H05.C4, may be assigned to the third storage server, S3 510, and stored in file system 512. Additionally, parity of column chunks, T1.D1.H10.C1^T1.D1.H11.C1^ T1.D1.H12.C1 through T1.D1.H10.C4^T1.D1.H11.C4^ T1.D1.H12.C4, may also be assigned to the third storage server, S3 510, and stored in file system 512. Column chunks, T1.D1.H06.C1 through T1.D1.H06.C4, may be assigned to the fourth storage server, S4 514, and stored in file system 516. Additionally, parity of column chunks, T1.D1.H01.C1^T1.D1.H02.C1^ T1.D1.H03.C1 through T1.D1.H01.C4^T1.D1.H02.C4^ T1.D1.H03.C4, may also be assigned to the fourth storage server, S4 514, and stored in file system 516.

Then column chunks T1.D1.H07.C1 through T1.D1.H07.C4 may be assigned to the third storage server, S3 510, and stored in file system 512. Next, column chunks T1.D1.H08.C1 through T1.D1.H08.C4 and T1.D1.H10.C1 through T1.D1.H10.C4 may be assigned to the fourth storage server, S4 514, and stored in file system 516. Column chunks T1.D1.H09.C1 through T1.D1.H09.C4 and T1.D1.H11.C1 through T1.D1.H11.C4 may be assigned to the first storage server, S1 502, and stored in file system 504. Finally, column chunks T1.D1.H12.C1 through T1.D1.H12.C4 may be assigned to the second storage server, S2 506, and stored in file system 508.

Similarly, there may be 48 column chunks created for data table T1.D2 with four column chunks in each of 12 hash buckets, which may be represented as T1.D2.H01.C1, T1.D2.H01.C2, T1.D2.H01.C3, T1.D2.H01.C4, T1.D2.H02.C1 ... T1.D2.H12.C4. These 48 column chunks may likewise be distributed across multiple servers using column chunk striping with redundancy in round robin order as illustrated in FIGS. 5A and 5B.

Figure 6:
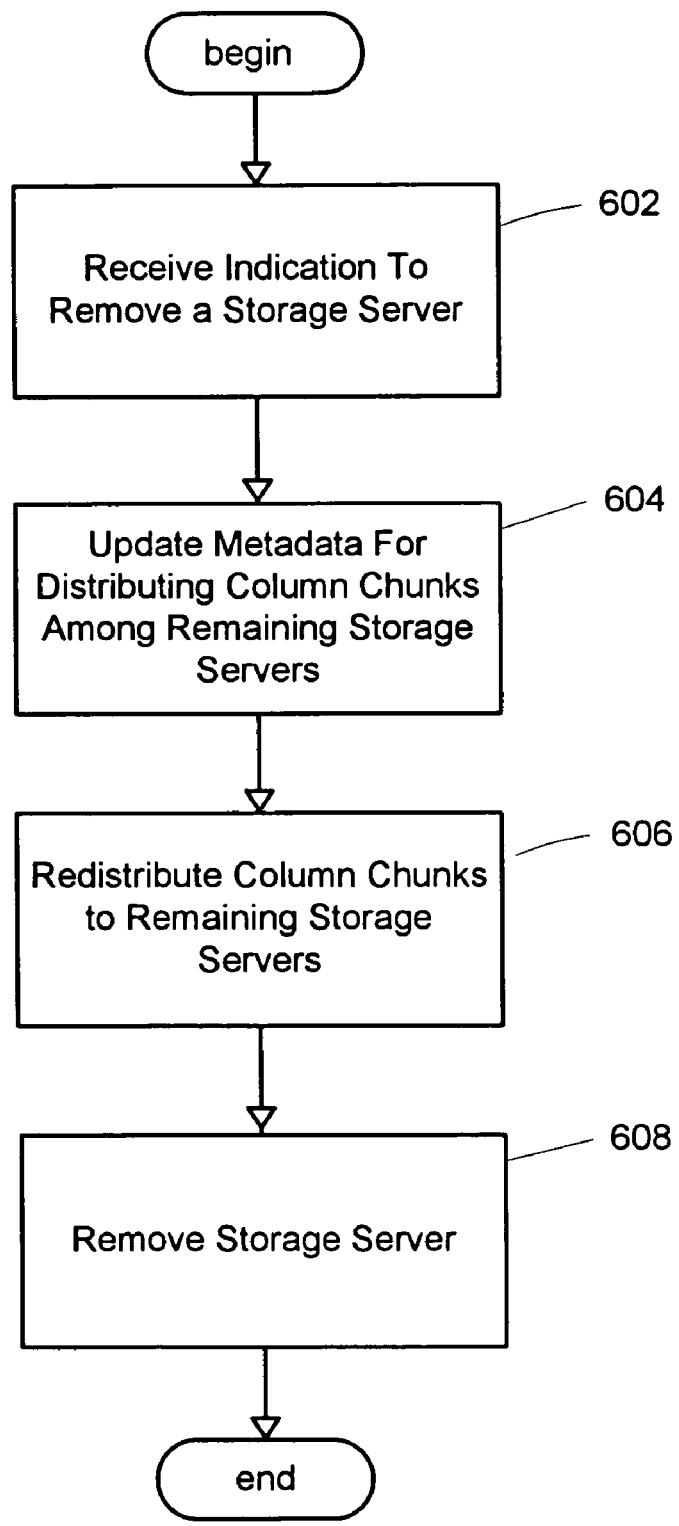
FIG. 6 is a flowchart generally representing the steps undertaken in one embodiment for removing a storage server in the column chunk data store, in accordance with an aspect of the present invention.

After the data tables may be partitioned, distributed and stored in the column chunks data store, one or more storage servers may be removed from the existing storage servers of the column chunks data store. FIG. 6 presents a flowchart generally representing the steps undertaken in one embodiment for removing a storage server in the column chunk data store. At step 602, an indication may be received to remove a storage server from the existing storage servers of the column chunk data store. For example, an indication may be received to remove storage server S4 from the existing storage servers S1 through S4. In an embodiment, metadata describing the configuration of a storage server may be changed to indicate that the storage server should be removed from the existing storage servers of the column chunk data store.

Upon receiving an indication to remove a storage server, metadata for distributing column chunks among the remaining storage servers may be updated at step 604. In an embodiment, a storage policy that may specify assigning column chunks to the storage server to be removed may be updated by removing that storage server from the list of storage servers to be used for storing column chunks. For instance, after receiving an indication to remove storage server S4 from the column chunk data store, the storage policy for data table T1 and the storage policy for data table T2 may be updated to specify distributing the column chunks across servers S1 through S3, instead of distributing the column chunks across servers S1 through S4 as may be previously specified. In addition to specifying how column chunks may be distributed among multiple storage servers in the column chunk data store, a storage policy may also specify the level of redundancy of the column chunks for recovery upon failure of one or more storage servers. If the number of storage servers remaining after removal of a storage server may no longer be greater than the number of column chunks used to compute a parity column chunk, then parity for column chunks may be recalculated as described below in more detail in conjunction with FIG. 7.

Figure 7:
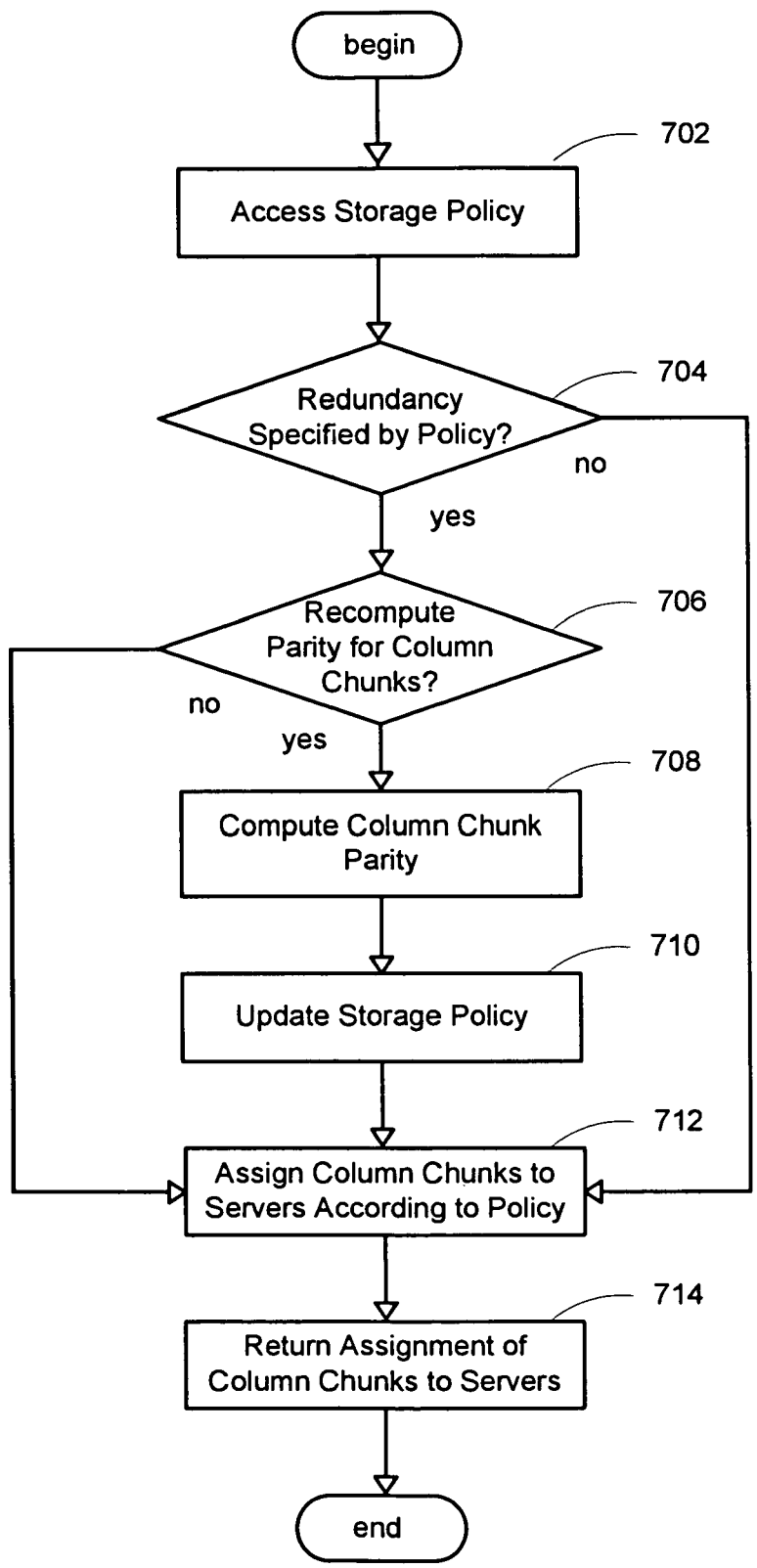
FIG. 7 is a flowchart generally representing the steps undertaken in one embodiment for recomputing parity of column chunks for a specified level of redundancy upon removal of a storage server in the column chunk data store, in accordance with an aspect of the present invention.

Once the metadata for distributing column chunks among the remaining storage servers may be updated, column chunks stored on the storage server to be removed may then be redistributed among the remaining storage servers at step 606 as may be specified by a storage policy in the updated metadata. After column chunks may be redistributed among the remaining storage servers, the storage server may be removed at step 608. In an embodiment, the metadata for configuring the storage server may indicate the server has a status of offline. Upon removing a storage server in the column chunk data store, processing may be finished.

Where the number of storage servers remaining after removal of a storage server may no longer be greater than the number of column chunks used to compute a parity column chunk, then the parity of column chunks may be recomputed. FIG. 7 presents a flowchart generally representing the steps undertaken in one embodiment for recomputing parity of column chunks for a specified level of redundancy upon removal of a storage server in the column chunk data store. At step 702, a storage policy may be accessed to determine whether to recomputed parity of column chunks upon removal of a storage server. For example, the storage policy may specify a level of redundancy for recovery from failure of one server in the column chunk data store and parity of column chunks may be computed using three column chunks for the column chunks stored in the column chunk data store.

It may be determined at step 704 whether any level of redundancy has been specified in the storage policy. If so, then it may be determined at step 706 whether to recompute the parity of column chunks to provide the level of redundancy specified in the storage policy that may be supported by the remaining storage servers after removal of a storage server. For instance, the number of column chunks used to compute a parity column chunk may be one less than the number of servers used to store the column chunks. If the number of column chunks used to compute the existing parity column chunks is greater than one less than the number of remaining storage servers that may be used to store the column chunks, then it may be determined to recompute the parity of column chunks. If it may be determined to recompute the parity of column chunks at step 706, then the parity of the column chunks may be calculated at step 708 for the level of redundancy specified in the storage policy. In an embodiment, the number of column chunks used to compute the parity column chunks may be one less than the number of remaining storage servers that may be used to store the column chunks. Upon calculating the parity column chunks at step 708, the storage policy may be updated at step 710 to indicate the number of column chunks used to compute parity to achieve the level of redundancy specified.

Once the storage policy may be updated at step 710 or if it may be determined that a level of redundancy may not be specified by the policy at step 704 or if it may be determined that the parity of column chunks should not be recomputed at step 706, then the column chunks, including any parity column chunks previously created, may be assigned to storage servers at step 712 according to the storage policy. For instance, if the storage policy may specify redundancy to recover from the failure of a server, then the column chunks and parity column chunks may be assigned as illustrated below in FIGS. 8A and 8B. After the column chunks and any parity column chunks may be assigned to storage servers, the assignment of the column chunks to the storage servers may be returned at step 714. When the assignment of the column chunks to the storage servers has been returned, processing for recomputing the parity of column chunks for the level of redundancy of column chunks that may be supported in the column chunk data store upon removal of a storage server is finished.

Figure 8A:
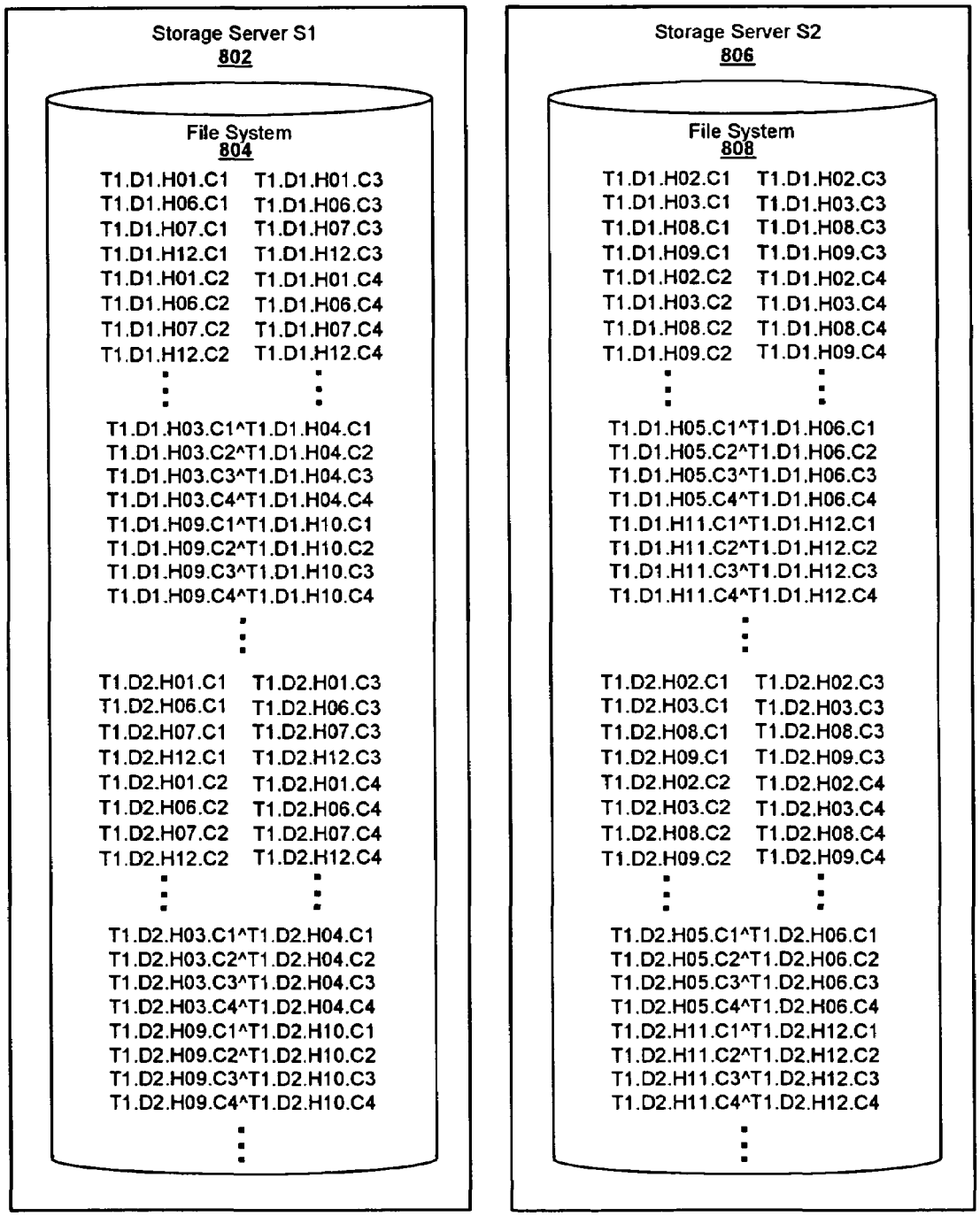
FIGS. 8A and 8B are exemplary illustrations generally depicting logical representations of column chunks of a partitioned data table striped across multiple storage servers after removal of a storage server, in accordance with an aspect of the present invention.
Figure 8B:
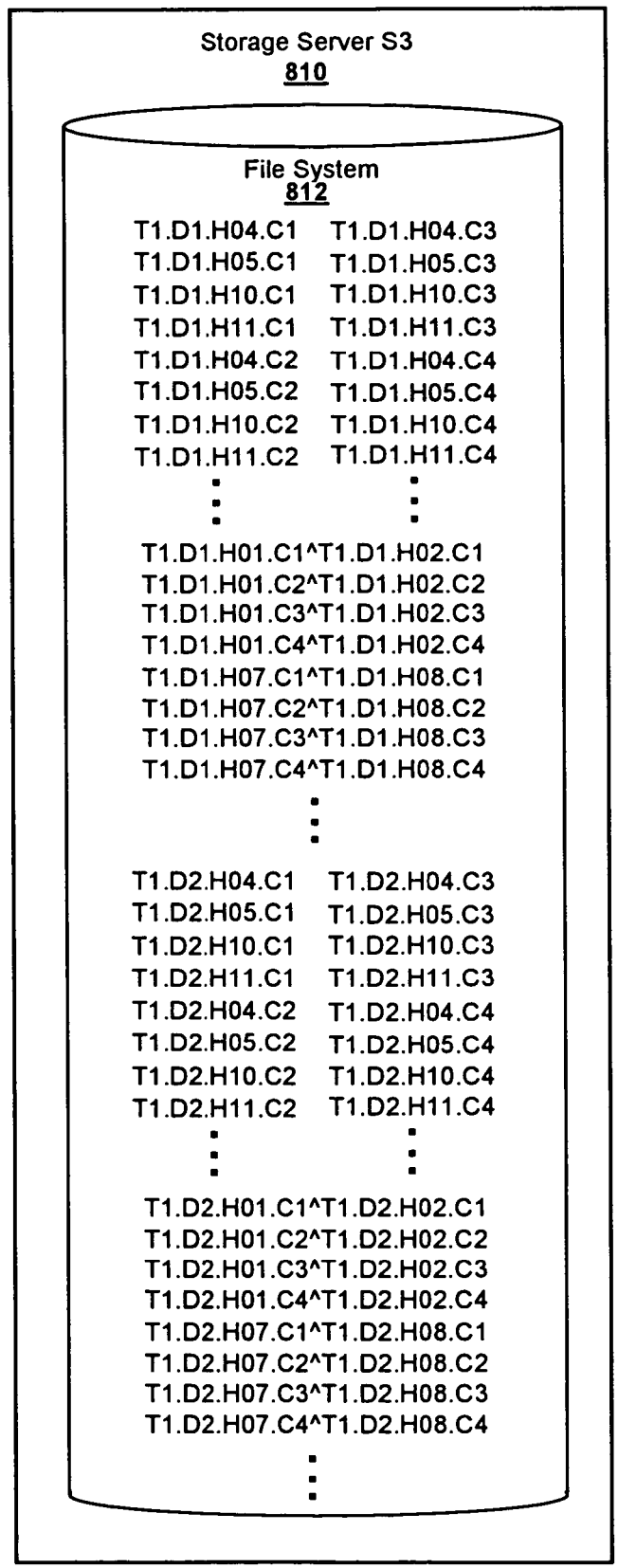

FIGS. 8A and 8B present exemplary illustrations generally depicting logical representations of column chunks of a partitioned data table striped across multiple storage servers after removal of a storage server. After data table T1 may be partitioned, distributed and stored across storage servers S1 502 through S4 514 as illustrated in FIGS. 5A and 5B, a storage server may be removed from the column chunks data store such as storage server S4. The metadata for data table T1 and data table T2 may be updated to specify distributing the column chunks across servers S1 through S3, instead of distributing the column chunks across servers S1 through S4 as may have been previously specified. Accordingly, column chunks from partitioned data tables T1.D1 and T1.D2 may then be redistributed among the multiple storage servers as specified by the storage policy in the updated metadata. The storage policy may specify a level of redundancy of the column chunks for recovery upon failure of one storage server. Considering that the removal of a storage server may still leave enough storage servers remaining to support the level of redundancy specified, the level of redundancy may be provided by recalculating the parity for the column chunks and then redistributing the column chunks so that a parity column chunk and any column chunk used to compute that parity column chunk may not be stored on the same storage server. Since there may be three servers remaining, parity column chunks may be recalculated by performing a bitwise XOR operation on two column chunks to create a parity column chunk instead of using three column chunks as done previously when there were four servers available. FIGS. 8A and 8B may illustrate an embodiment of redistributing the column chunks from partitioned data tables T1.D1 and T1.D2 so that these column chunks may be striped in round robin order with redundancy for recovery of a failed server across storage servers S1 through S3.

First of all, the column chunks created for partitioned data table T1.D1 and parity column chunks created may be redistributed so that these column chunks may be striped in round robin order across storage servers S1 through S3. Specifically, column chunks T1.D1.H01.C1 through T1.D1.H01.C4, T1.D1.H06.C1 through T1.D1.H06.C4, T1.D1.H07.C1 through T1.D1.H07.C4, T1.D1.H12.C1 through T1.D1.H12.C4, and parity column chunks T1.D1.H03.C1^T1.D1.H04.C1 through T1.D1.H03.C4^T1.D1.H04.C4 and T1.D1.H09.C1^T1.D1.H10.C1 through T1.D1.H09.C4^T1.D1.H10.C4 may be assigned to the first storage server, S1 502, and stored in file system 504. Column chunks T1.D1.H02.C1 through T1.D1.H02.C4, T1.D1.H03.C1 through T1.D1.H03.C4, T1.D1.H08.C1 through T1.D1.H08.C4, T1.D1.H09.C1 through T1.D1.H09.C4, and parity column chunks T1.D1.H05.C1^T1.D1.H06.C1 through T1.D1.H05.C4^T1.D1.H06.C4 and T1.D1.H11.C1^T1.D1.H12.C1 through T1.D1.H11.C4^T1.D1.H12.C4 may be assigned to the second storage server, S2 506, and stored in file system 508. And column chunks T1.D1.H04.C1 through T1.D1.H04.C4, T1.D1.H05.C1 through T1.D1.H05.C4, T1.D1.H10.C1 through T1.D1.H10.C4, T1.D1.H11.C1 through T1.D1.H11.C4, and parity column chunks T1.D1.H01.C1^T1.D1.H02.C1 through T1.D1.H01.C4^T1.D1.H02.C4 and T1.D1.H07.C1^T1.D1.H08.C1 through T1.D1.H07.C4^T1.D1.H08.C4 may be assigned to the third storage server, S3 510, and stored in file system 512.

Similarly, the column chunks created for partitioned data table T1.D2 and parity column chunks created may be redistributed so that these column chunks may be striped in round robin order across storage servers S1 through S3. For example, column chunks T1.D2.H01.C1 through T1.D2.H01.C4, T1.D2.H06.C1 through T1.D2.H06.C4, T1.D2.H07.C1 through T1.D2.H07.C4, T1.D2.H12.C1 through T1.D2.H12.C4, and parity column chunks T1.D2.H03.C1^T1.D2.H04.C1 through T1.D2.H03.C4^T1.D2.H04.C4 and T1.D2.H09.C1^T1.D2.H10.C1 through T1.D2.H09.C4^T1.D2.H10.C4 may be assigned to the first storage server, S1 502, and stored in file system 504. Column chunks T1.D2.H02.C1 through T1.D2.H02.C4, T1.D2.H03.C1 through T1.D2.H03.C4, T1.D2.H08.C1 through T1.D2.H08.C4, T1.D2.H09.C1 through T1.D2.H09.C4, and parity column chunks T1.D2.H05.C1^T1.D2.H06.C1 through T1.D2.H05.C4^T1.D2.H06.C4 and T1.D2.H11.C1^T1.D2.H12.C1 through T1.D2.H11.C4^T1.D2.H12.C4 may be assigned to the second storage server, S2 506, and stored in file system 508. And column chunks T1.D2.H04.C1 through T1.D2.H04.C4, T1.D2.H05.C1 through T1.D2.H05.C4, T1.D2.H10.C1 through T1.D2.H10.C4, T1.D2.H11.C1 through T1.D2.H11.C4, and parity column chunks T1.D2.H01.C1^T1.D2.H02.C1 through T1.D2.H01.C4^T1.D2.H02.C4 and T1.D2.H07.C1^T1.D2.H08.C1 through T1.D2.H07.C4^T1.D2.H08.C4 may be assigned to the third storage server, S3 510, and stored in file system 512.

To redistribute the column chunks for partitioned data tables T1.D1 and T1.D2, column chunks may be moved from storage servers S1 through S4 as illustrated in FIGS. 5A and 5B to storage servers S1 through S3 as illustrated in FIGS. 8A and 8B. For example, T1.D1.H03.C1 through T1.D1.H03.C4 and T1.D2.H03.C1 through T1.D2.H03.C4 may be moved from storage server S3 as illustrated in FIG. 5B to storage server S2 as illustrated in FIG. 8A. By so moving column chunks for partitioned data tables T1.D1 and T1.D2, the column chunks previously stored on servers S1 through S4 may be redistributed so that they may be striped across servers S1 through S3 along with the new parity column chunks created before removal of storage server S4. Those skilled in the art will appreciate that these column chunks may also be redistributed differently in various other embodiments, including embodiments where a different number of storage servers have been removed.

Thus the present invention may flexibly support removing a storage server in a distributed column chunk data store. By changing the storage policy for column chunks of partitioned data tables, the column chunks may be redistributed accordingly among the remaining storage servers. Moreover, the same level of redundancy may be achieved if there are a sufficient number of remaining servers by recomputing the parity of column chunks. As long as there is sufficient storage available for storing additional parity column chunks on the remaining storage servers, recomputing the parity of column chunks may advantageously support providing the same level of redundancy in the event a storage server may be removed.

As can be seen from the foregoing detailed description, the present invention provides an improved system and method for removing a storage server in a distributed column chunk data store. Any data table may be flexibly partitioned into column chunks by applying various partitioning methods using one or more columns as a key, including range partitioning, list partitioning, hash partitioning, and/or combinations of these partitioning methods. Furthermore, domain specific compression may be applied to a column chunk to reduce storage requirements of column chunks and decrease transmission delays for transferring column chunks between storage servers. Storage servers may then be easily removed in the distributed column chunk data store and column chunks may be flexibly redistributed among the remaining storage servers. Such a system and method support storing detailed data needed by data mining, segmentation and business intelligence applications over long periods of time. As a result, the system and method provide significant advantages and benefits needed in contemporary computing, and more particularly in data mining and business intelligence applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for removing a storage server in a distributed system, comprising:
    removing a storage server operably coupled to one or more storage servers storing column chunks of a partitioned data table;
    updating metadata for distributing the column chunks stored on the storage server among the one or more storage servers; and
    migrating some of the column chunks among the storage server and the one or more storage servers.

2. The method of claim 1 wherein updating metadata for distributing the column chunks stored on the storage server comprises updating a storage policy that specifies a distribution scheme for assigning a column chunk to the one or more storage servers.

3. The method of claim 1 wherein updating metadata for distributing the column chunks stored on the storage server comprises updating a storage policy that specifies a redundancy level for recovery from failure of a storage server.

4. The method of claim 1 wherein updating metadata for distributing the column chunks stored on the storage server comprises determining whether to recompute parity of the column chunks.

5. The method of claim 1 wherein migrating some of the column chunks among the storage server and the one or more storage servers comprises moving at least one of the column chunks from the storage server to one storage server of the one or more storage servers.

6. The method of claim 1 wherein migrating some of the column chunks among the storage server and the one or more storage servers comprises moving at least one of the column chunks stored on one storage server of the one or more storage servers to another storage server of the one or more storage servers.

7. The method of claim 1 wherein migrating some of the column chunks among the storage server and the one or more storage servers comprises creating new parity column chunks for a redundancy level specified in a storage policy for recovery from failure of a storage server.

8. The method of claim 7 further comprising storing the column chunks used to create a new parity column chunk on a different storage server than the storage server used for storing the new parity column chunk.

9. A computer-readable storage medium having computer-executable instructions for performing the method of claim 1.

10. A computer-implemented method for removing a storage server in a distributed system, comprising:
    removing a storage server operably coupled to one or more storage servers storing column chunks of a partitioned data table;
    updating metadata for distributing the column chunks stored on the storage server among the one or more storage sewers;
    determining whether to recompute parity of the column chunks; and
    moving the column chunks stored on the storage server to the one or more storage servers.

11. The method of claim 10 further comprising computing new parity column chunks for the column chunks.

12. The method of claim 11 further comprising assigning a storage server for storing each of the column chunks.

13. The method of claim 12 further comprising assigning a different storage server for storing a new parity column chunk than the storage servers assigned for storing the column chunks used to create the new parity column chunk.

14. A computer-readable storage medium having computer-executable instructions for performing the method of claim 10.

15. A distributed computer system for storing data tables, comprising:
    means for removing a storage server operably coupled to one or more storage servers storing column chunks of a partitioned a data table;
    means for updating metadata for distributing the column chunks stored on the storage server among the one or more storage servers; and
    means for migrating some of the column chunks among the storage server and the one or more storage servers.

16. The distributed computer system of claim 15 further comprising means for determining whether to recompute parity of the column chunks.

17. The distributed computer system of claim 15 further comprising means for recomputing parity of the column chunks.

18. The distributed computer system of claim 17 further comprising means for storing a recomputed parity column chunk on a different storage server than the storage servers storing the column chunks used to compute the recomputed parity column chunk.

19. The distributed computer system of claim 15 wherein means for migrating some of the column chunks among the storage server and the one or more storage servers comprises means for moving column chunks stored on the storage server to the one or more storage servers.

20. The distributed computer system of claim 15 wherein means for migrating some of the column chunks among the storage server and the one or more storage server comprises means for moving at least one of the column chunks stored on one storage server of the one or more storage servers to another storage sewer of the one or more storage servers.

* * * * *

UNITED STATES PATENT AND TRADEMARK OFFICE
CERTIFICATE OF CORRECTION

PATENT NO.        : 7,587,569 B2                                                             Page 1 of 1
APPLICATION NO.   : 11/305963
DATED             : September 8, 2009
INVENTOR(S)       : Radha Krishna Uppala It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this

Twenty-first Day of September, 2010

David J. Kappos
*Director of the United States Patent and Trademark Office*